May 2, 1967
C. H. BECKER ETAL
3,317,167
FASTENER COMBINATION FOR SECURING TUBULAR STRUCTURES
Filed Nov. 2, 1965
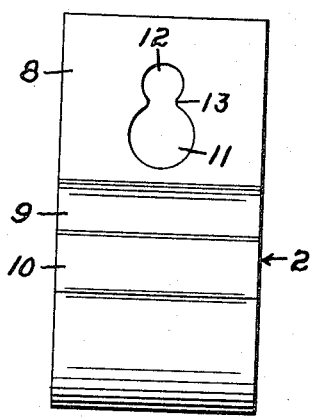
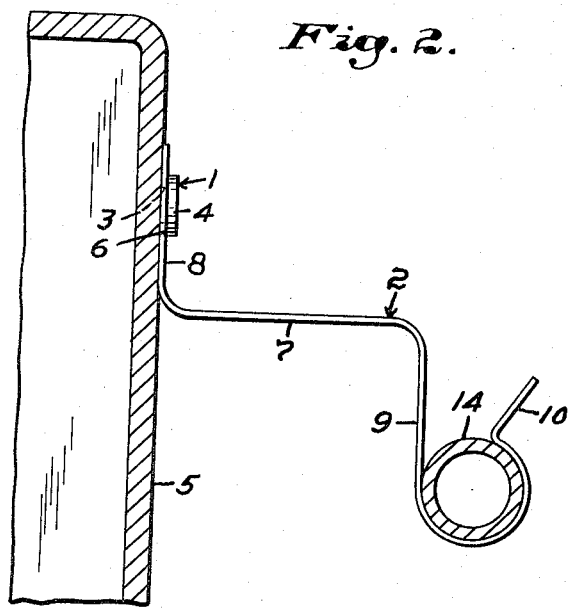
Inventors:
Charles H. Becker &
Richard I. Jones,
by James R. O'Connor
Atty.

United States Patent Office 3,317,167
Patented May 2, 1967

3,317,167
FASTENER COMBINATION FOR SECURING TUBULAR STRUCTURES
Charles H. Becker, Braintree, and Richard I. Jones, Lexington, Mass., assignors to United-Carr Incorporated, Boston, Mass., a corporation of Massachusetts
Filed Nov. 2, 1965, Ser. No. 506,037
2 Claims. (Cl. 248—73)

The present invention relates generally to a novel fastener combination for securing tubes, wires, cables and the like articles in lateral offset relationship with respect to a supporting panel, and more specifically to a fastener combination for attaching a condenser to the back portion of a refrigerator box.

An object of the invention is to provide a simple, inexpensive, easily installed and highly efficient fastener combination for securing an article to a supporting panel.

Another object of the invention is to provide a fastener combination wherein the male component is affixed to the supporting panel without perforation thereof.

A still further object of the invention is to provide an improved fastener combination for securing a tubular condenser to a refrigerator box.

Additional objects and advantages of the novel fastener combination will become evident from a reading of the following detailed description in conjunction with a viewing of the accompanying drawing in which:

FIG. 1 is a front elevation of a clip which is one of the components of the fastener combination; and FIG. 2 is an installation partly in section depicting the fastener combination as employed to secure a tubular article to a supporting sheet metal structure.

The fastener combination comprises a small metal stud 1 and a reslient sheet metal clip 2.

The stud 1 includes a shank 3 and a generally circular head 4, the head being of greater diameter than the shank. The shank 3 is adapted to be fusedly secured by welding or some other means to the sheet metal supporting panel 5 at the end of the shank opposite the head 4 such that the head is spaced from but lies close to the surface of the panel 5 and the undersurface 6 of the head faces inwardly towards the surface of the panel. The distance between the undersurface of the head and the surface of the panel is approximately equal to the thickness of the stud-engaging arm of the clip to be described hereinafter.

The clip 2 includes a generally horizontal base 7, a stud-engaging arm 8 extending upwardly from one end of the base generally normal thereto and an article-engaging arm 9 having a hook shape extending downwardly from the end of the base opposite the stud-engaging arm 8 and generally normal to the base. The article-engaging arm 9 terminates in a free end portion 10 extending angularly away from the other portions of the clip 2 and providing a safe entrance to the loop in the hook-shaped arm 9.

The stud-engaging arm 8 is provided with a slot having a first circular opening 11 of a diameter slightly greater than the stud head 4 and a second circular opening 12 connected to the first opening 11 by a narrow neck portion 13 and having a diameter slightly greater than the stud shank 3 but less than the head 4.

Once the stud 1 has been affixed to the panel 5, the clip 2 is attached thereto by passing the stud head 4 through the larger opening 11 and drawing the clip downwardly until the stud shank 3 snaps past the neck 13 and into the second circular opening 12. Once the clip is secured to the panel 5, the tubular article 14, for example, a condenser, may be readily snapped into the loop in the hook-shaped arm 9.

The reader will appreciate that as many of the fasteners as desired may be secured to the supporting panel 5 at spaced intervals for securing a plurality of tubular articles and further that the use of a fastener combination which eliminates the necessity of forming a fastener-receiving aperture in the panel 5 is particularly advantageous in a refrigerator since the moisture forming on a condenser cannot leak into the interior of the box.

Further, it is to be understood that what has been disclosed herein for purposes of illustration is not to be interpreted in a limiting sense in that the scope of the invention is best defined by the following claims.

We claim:

1. An assembly comprising, in combination, a sheet metal support, a clip including a laterally extending portion, an attaching arm extending upwardly from one end of said laterally extending fastener, said attaching arm having a keyhole-shaped slot formed therein, and an article-retaining arm extending downwardly from said laterally extending portion at the end thereof opposite said attaching arm, said article-retaining arm being curled back on itself to provide a loop portion which snappingly engages an article, a stud having a shank and a generally circular head at one end of said shank, said head being of greater diameter than said shank, said shank being welded to a surface of the support at its end opposite said head such that said head is spaced from, but lies in, close proximity to the surface of the support, the space between the undersurface of said head and the support being approximately equal to the thickness of the attaching arm of said clip, said shank being seated in the narrow portion of said keyhole slot in said attaching arm, said head being clamped against the portions of said attaching arm adjacent said slot at the surface of said arm remote from said support, thereby tensioning said attaching arm against said support.

2. A fastener combination according to claim 5 wherein said article-retaining arm has a free end extending upwardly toward said laterally extending portion and angularly away from said arm at the end of said loop portion.

References Cited by the Examiner
UNITED STATES PATENTS

| 1,420,724 | 6/1922 | Marona et al. | 248—227 |
| 2,936,981 | 5/1960 | Aversten | 248—74 |
| 3,055,462 | 9/1962 | Steele | 189—36 |
| 3,071,400 | 1/1963 | Bellock | 248—224 X |
| 3,120,938 | 2/1964 | Lucas | 248—68 |
| 3,173,639 | 3/1965 | Dunn | 248—65 |
| 3,218,012 | 11/1965 | Volpe | 248—62 |

FOREIGN PATENTS

| 974,002 | 11/1964 | Great Britain. |
| 65,818 | 2/1943 | Norway. |

CLAUDE A. LE ROY, Primary Examiner.

UNITED STATES PATENT OFFICE
CERTIFICATE OF CORRECTION

Patent No. 3,317,167                         May 2, 1967

Charles H. Becker et al.

It is hereby certified that error appears in the above numbered patent requiring correction and that the said Letters Patent should read as corrected below.

In the heading to the printed specification, line 6, for "a corporation of Massachusetts" read -- a corporation of Delaware --.

Signed and sealed this 28th day of November 1967.

(SEAL)
Attest:

Edward M. Fletcher, Jr.
Attesting Officer

EDWARD J. BRENNER
Commissioner of Patents